United States Patent
Liu

(10) Patent No.: US 10,922,497 B2
(45) Date of Patent: Feb. 16, 2021

(54) METHOD FOR SUPPORTING TRANSLATION OF GLOBAL LANGUAGES AND MOBILE PHONE

(71) Applicant: WING TAK LEE SILICONE RUBBER TECHNOLOGY (SHENZHEN) CO., LTD, Guangdong (CN)

(72) Inventor: Tak Nam Liu, Guangdong (CN)

(73) Assignee: WING TAK LEE SILICONE RUBBER TECHNOLOGY (SHENZHEN) CO., LTD, Shenzhen (CN)

( * ) Notice: Subject to any disclaimer, the term of this patent is extended or adjusted under 35 U.S.C. 154(b) by 124 days.

(21) Appl. No.: 16/296,248

(22) Filed: Mar. 8, 2019

(65) Prior Publication Data

US 2020/0125644 A1  Apr. 23, 2020

(30) Foreign Application Priority Data

Oct. 17, 2018 (CN) .......................... 201811211343.7

(51) Int. Cl.
| | | |
|---|---|---|
| G06F 40/58 | (2020.01) | |
| G10L 15/00 | (2013.01) | |
| G10L 15/22 | (2006.01) | |
| G10L 15/30 | (2013.01) | |
| H04M 1/60 | (2006.01) | |

(52) U.S. Cl.
CPC ............ *G06F 40/58* (2020.01); *G10L 15/005* (2013.01); *G10L 15/22* (2013.01); *G10L 15/30* (2013.01); *H04M 1/6041* (2013.01); *H04M 2242/12* (2013.01); *H04M 2242/14* (2013.01)

(58) Field of Classification Search
CPC ....... G06F 40/58; G06F 40/40; G10L 15/005; G10L 15/265; G10L 15/30; H04M 2242/12; H04M 2242/14
USPC ................................. 704/3, 277, 2, 8; 706/16
See application file for complete search history.

(56) References Cited

U.S. PATENT DOCUMENTS

| | | | | |
|---|---|---|---|---|
| 6,807,574 | B1 * | 10/2004 | Partovi | G06Q 30/06 709/224 |
| 7,894,596 | B2 * | 2/2011 | Moore, Jr. | H04M 3/493 379/265.12 |
| 9,257,115 | B2 * | 2/2016 | Waibel | G06F 40/174 |
| 9,547,642 | B2 * | 1/2017 | Potkonjak | G06F 40/58 |
| 2003/0065504 | A1 * | 4/2003 | Kraemer | G06F 40/58 704/8 |
| 2005/0144012 | A1 * | 6/2005 | Afrashteh | G10L 15/26 704/277 |

(Continued)

*Primary Examiner* — Martin Lerner

(57) ABSTRACT

The present disclosure provides a method for supporting translation of global languages, and the product thereof. The method includes the following steps: receiving, by a smart phone, a calling request sent by a terminal, connecting the calling request, and establishing a calling connection; receiving, by the smart phone, first voice information transmitted through the calling connection, identifying a first language and a first dialect that correspond to the first voice information, obtaining a translation model corresponding to the first dialect, and translating the first voice information of the first dialect into second voice information of a second dialect; and playing, by the smart phone, the second voice information of the second dialect by using a speaker device.

3 Claims, 3 Drawing Sheets

```
S201: A smart phone receives a calling request sent by a terminal, connects the calling request, and establishes a calling connection S202: The smart phone receives first voice information, identifies first language and first dialect corresponding to the first voice information, obtains translation model corresponding to the first dialect, and translates the first voice information into second voice information of a second dialect S203: The smart phone plays the second voice information by using a speaker device
```

(56) References Cited

U.S. PATENT DOCUMENTS

| | | | |
|---|---|---|---|
| 2008/0306727 A1* | 12/2008 | Thurmair | G06F 40/55 704/4 |
| 2009/0048820 A1* | 2/2009 | Buccella | G06F 40/58 704/2 |
| 2010/0082328 A1* | 4/2010 | Rogers | G06F 40/263 704/8 |
| 2010/0185434 A1* | 7/2010 | Burvall | G06F 40/58 704/3 |
| 2010/0299150 A1* | 11/2010 | Fein | G06F 40/58 704/277 |
| 2010/0324884 A1* | 12/2010 | Jeffrey | G10L 13/00 704/2 |
| 2011/0125486 A1* | 5/2011 | Jaiswal | G06F 40/58 704/3 |
| 2011/0307241 A1* | 12/2011 | Waibel | G06F 40/58 704/2 |
| 2012/0046933 A1* | 2/2012 | Frei | G10L 15/26 704/2 |
| 2012/0109649 A1* | 5/2012 | Talwar | G10L 15/005 704/236 |
| 2012/0179448 A1* | 7/2012 | Gupta | H04W 4/029 704/2 |
| 2012/0330643 A1* | 12/2012 | Frei | G10L 13/00 704/2 |
| 2014/0257805 A1* | 9/2014 | Huang | G06N 3/0454 704/232 |
| 2014/0324412 A1* | 10/2014 | Itamoto | G10L 15/00 704/3 |
| 2014/0337007 A1* | 11/2014 | Waibel | G10L 13/02 704/3 |
| 2014/0358516 A1* | 12/2014 | Lin | G06F 40/58 704/2 |
| 2015/0046158 A1* | 2/2015 | Efrati | G10L 21/003 704/235 |
| 2015/0051897 A1* | 2/2015 | Waibel | G06F 40/58 704/2 |
| 2015/0058023 A1* | 2/2015 | Goo | G10L 15/005 704/277 |
| 2015/0095011 A1* | 4/2015 | Furihata | G06F 40/58 704/2 |
| 2015/0161114 A1* | 6/2015 | Buryak | G06F 40/58 704/8 |
| 2015/0347399 A1* | 12/2015 | Aue | H04M 11/10 704/2 |
| 2015/0350451 A1* | 12/2015 | Aue | H04M 3/567 379/202.01 |
| 2016/0170970 A1* | 6/2016 | Lindblom | G06F 40/40 704/3 |
| 2016/0210959 A1* | 7/2016 | Efrati | G10L 21/003 |
| 2017/0060854 A1* | 3/2017 | Zeng | G06F 40/205 |
| 2017/0357640 A1* | 12/2017 | Bellegarda | G06F 40/58 |
| 2018/0013893 A1* | 1/2018 | Cohen | G06Q 10/0631 |
| 2018/0293228 A1* | 10/2018 | Tarakji | G06F 40/58 |
| 2019/0013011 A1* | 1/2019 | Huang | G06F 40/40 |
| 2019/0130931 A1* | 5/2019 | Costa | G08B 27/001 |
| 2019/0180049 A1* | 6/2019 | LeCour | G06F 16/353 |
| 2019/0228763 A1* | 7/2019 | Czarnowski | G06N 3/063 |
| 2019/0267000 A1* | 8/2019 | Liashenko | G10L 15/30 |
| 2019/0347551 A1* | 11/2019 | Lobacheva | G06N 3/08 |
| 2020/0043481 A1* | 2/2020 | Xiong | G10L 15/1822 |
| 2020/0125643 A1* | 4/2020 | Gutierrez | G06F 40/58 |
| 2020/0125645 A1* | 4/2020 | Liu | G06F 40/58 |

* cited by examiner

METHOD FOR SUPPORTING TRANSLATION OF GLOBAL LANGUAGES AND MOBILE PHONE

CROSS REFERENCE TO RELATED APPLICATION

The present application claims priority to Chinese patent application No. 201811211343.7, entitled "Method for Supporting Translation of Global Languages and Mobile Phone", filed on Oct. 17, 2018, the entire content of which is incorporated herein by reference.

TECHNICAL FIELD

The present application relates to the field of communication and translation technologies, and specifically, to a method for supporting translation of global languages, and a mobile phone.

BACKGROUND

Translation is a process of translating a relatively strange expression manner into a relatively familiar expression manner. Translated content includes languages, characters, graphs, and symbols. Therefore, translation is an important mean of promoting social networking and development of people.

Existing translation is mainly for translation between different languages, but cannot implement translation between different dialects of a same language in different regions. For example, more than 90% Chinese people cannot understand Cantonese, and it is also very difficult to understand a Jiangsu dialect, a Zhejiang dialect, and a Shanghai dialect for people from other places. In this case, a current mobile phone cannot implement translation, and as a result, translation of global languages cannot be implemented, affecting user experience.

SUMMARY

Embodiments of the present application provide a method for supporting translation of global languages, and a mobile phone, so that translation between dialects can be implemented, and user experience can be improved.

According to a first embodiment, an embodiment of the present application provides a method for supporting translation of global languages. The method includes the following steps:

receiving, by a smart phone, a calling request sent by a terminal, connecting the calling request, and establishing a calling connection;

receiving, by the smart phone, first voice information transmitted through the calling connection, identifying a first language and a first dialect that correspond to the first voice information, obtaining a translation model corresponding to the first dialect, and translating the first voice information of the first dialect into second voice information of the second dialect; and playing, by the smart phone, the second voice information of the second dialect by using a speaker device.

Preferably, the identifying a first language and a first dialect that correspond to the first voice information specifically includes:

extracting a current location of the terminal corresponding to the first voice information, identifying a nationality and a city of the current location, determining a language corresponding to the nationality as the first language, and determining a dialect corresponding to the city as the first dialect.

Preferably, the identifying a first language and a first dialect that correspond to the first voice information specifically includes:

extracting a number of the terminal corresponding to the first voice information, determining a native place of a user corresponding to the number, determining a language of a country corresponding to the native place as the first language, and determining a dialect corresponding to the native place as the first dialect.

Preferably, a method of obtaining a translation model corresponding to the first dialect, and translating the first voice information of the first dialect into second voice information of the second dialect specifically includes:

if the translation model is a deep learning model, determining a first location range of a weight corresponding to the first dialect in the deep learning model, reserving an element value in the first location range of the weight, zeroing all remaining locations of the weight to obtain a first weight corresponding to the first dialect, and performing computation and translation by using the first weight and input data that corresponds to the first dialect, to obtain the second voice information of the second dialect.

According to the second embodiment, a smart phone is provided. The smart phone includes a processor, a communication unit, and a speaker device, where the communication unit is configured to receive a calling request sent by a terminal, connect the calling request, establish a calling connection, and receive first voice information transmitted through the calling connection; and the processor is configured to identify a first language and a first dialect that correspond to the first voice information, obtain a translation model corresponding to the first dialect, translate the first voice information of the first dialect into second voice information of the second dialect, and control the speaker device to play the second voice information of the second dialect.

Preferably, the processor is specifically configured to extract a current location of the terminal corresponding to the first voice information, identify a nationality and a city of the current location, determine a language corresponding to the nationality as the first language, and determine a dialect corresponding to the city as the first dialect.

Preferably, the processor specifically extracts a number of the terminal corresponding to the first voice information, determines a native place of a user corresponding to the number, determines a language of a country corresponding to the native place as the first language, and determines a dialect corresponding to the native place as the first dialect.

Preferably, the processor is specifically configured to: if the translation model is a deep learning model, determine a first location range of a weight corresponding to the first dialect in the deep learning model, reserve an element value in the first location range of the weight, zero all remaining locations of the weight to obtain a first weight corresponding to the first dialect, and perform computation and translation by using the first weight and input data that corresponds to the first dialect, to obtain the second voice information of the second dialect.

According to the third embodiment, a computer readable storage medium is provided. The computer readable storage medium stores a program used for electronic data exchange, and the program enables a terminal to perform the method provided in the first embodiment.

Implementation of the embodiments of the present application has the following beneficial effects.

It can be learned that in the technical solutions provided in this application, when the calling request is received, the calling request is answered, and the calling connection is established. After the first voice information is received based on the calling connection, the first language and the first dialect of the first voice information are determined, and then the translation model corresponding to the first dialect is extracted to translate the first dialect into the second voice information of the second dialect. In this way, translation between different dialects of a same language is implemented, communication costs are reduced, and user experience is improved.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show some embodiments of the present application, and a person of ordinary skill in the art may still derive other drawings from these accompanying drawings without creative efforts.

DESCRIPTION OF THE EMBODIMENTS

The following clearly and completely describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

In the specification, claims, and accompanying drawings of the present application, the terms "first", "second", "third", "fourth" and so on are intended to distinguish between different objects but do not indicate a particular order. In addition, terms "including" and "having", and any variants thereof intend to cover non-exclusive inclusion. For example, a process, method, system, product, or device including a series of steps or units is not limited to the listed steps or units, and optionally, may further include a step or unit that is not listed, or optionally, may further include other steps or units inherent to the process, method, product, or device.

When an "embodiment" is mentioned in this specification, it means that a particular feature, result, or characteristic described with reference to this embodiment may be included in at least one embodiment of the present application. The word in various locations in this specification does not necessarily mean a same embodiment, and is not an embodiment independent from other embodiments or a candidate embodiment of other embodiments. A person skilled in the art may explicitly and implicitly understand that the embodiment described in this specification may be combined with other embodiments.

Figure 1:
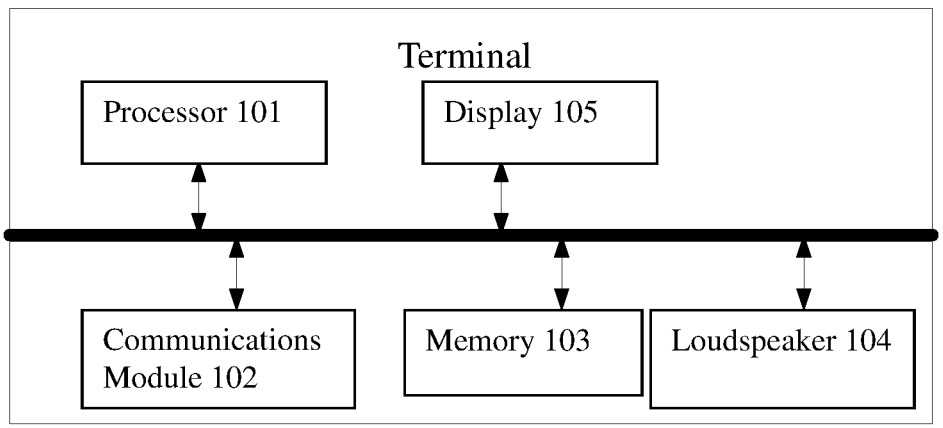
FIG. 1 is a schematic structural diagram of a terminal.

Referring to FIG. 1, FIG. 1 is a schematic structural diagram of a terminal. As shown in FIG. 1, the terminal includes a processor 101, a display 105, a communication module 102, a memory 103, and a loudspeaker 104.

The processor 101 may specifically include a multi-core processor.

Preferably, the processor 101 may further integrate a neural network processing chip. The neural network processing chip itself may include an internal memory for data storage.

Figure 2:
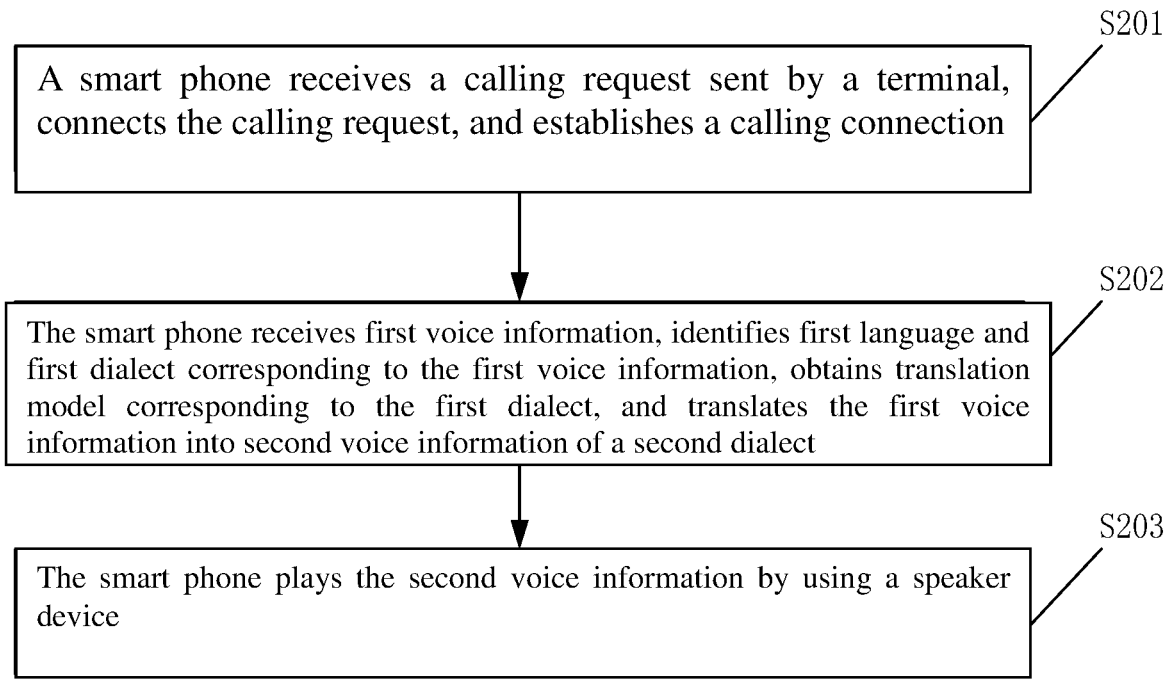
FIG. 2 is a schematic flowchart of a method for supporting translation of global languages.

Referring to FIG. 2, FIG. 2 provides a method for supporting translation of global languages. The method is performed by the terminal shown in FIG. 1. The terminal may be specifically a smart phone. As shown in FIG. 2, the method includes the following steps:

Step S201: A smart phone receives a calling request sent by a terminal, connects the calling request, and establishes a calling connection.

The terminal may be an intelligent device such as a mobile phone, a tablet computer, or a PDA.

Preferably, the calling request may be specifically a 2G-based calling request, or may be a 4G-based calling request, that is, VOLTE, or certainly, may be a 5G based calling request or a short range calling request, for example, an interphone.

Step S202: The smart phone receives first voice information transmitted through the calling connection, identifies the first language and the first dialect that corresponds to the first voice information, obtains a translation model corresponding to the first dialect, and translates the first voice information of the first dialect into second voice information of the second dialect.

The second dialect is a preset dialect, for example, Sichuan dialect, Shanghai dialect, Minnan (Sorth Fujian) dialect, or Cantonese.

The identifying the first language and the first dialect that correspond to the first voice information may specifically include:

extracting a current location of the terminal corresponding to the first voice information, identifying a nationality and a city of the current location, determining a language corresponding to the nationality as the first language, and determining a dialect corresponding to the city as the first dialect.

Specifically, an actual example is used. For example, a location of a terminal A is Guangzhou, China, and then it is determined that a language, Chinese, corresponding to China is the first language, and a dialect, Cantonese, corresponding to Guangzhou is the first dialect.

The identifying the first language and the first dialect that correspond to the first voice information may specifically include:

extracting a number of the terminal corresponding to the first voice information, determining a native place of a user corresponding to the number, determining a language of a country corresponding to the native place as the first language, and determining a dialect corresponding to the native place as the first dialect.

Specifically, for example, a user A sends first voice information, and a number of the user A is 13901234567. Then, a home location is determined according to the number, and a native place of the user A is determined as Beijing, China. Then, Chinese is determined as the first language, and a Beijing dialect corresponding to Beijing is determined as the first dialect.

Preferably, the identifying the first language and the first dialect that correspond to the first voice information may specifically include:

sending the first voice information to a classifier for classification processing, to obtain the first language and the first dialect that correspond to the first voice information. The classifier may be specifically a neural network model, and certainly may be another classifier, for example, a machine learning model or a deep learning model.

A method of obtaining a translation model corresponding to the first dialect, and translating the first voice information of the first dialect into second voice information of the second dialect may specifically include:

if the translation model is a deep learning model, determining the first location range of a weight corresponding to the first dialect in the deep learning model, reserving an element value in the first location range of the weight, zeroing all remaining locations of the weight to obtain the first weight corresponding to the first dialect, and performing computation and translation by using the first weight and input data that corresponds to the first dialect, to obtain the second voice information of the second dialect.

A based principle is as follows: For example, a weight is three-dimensional data, and the weight may be CI*H*W, where CI is a depth value, H is a height value, and W is a width value. For distribution of the weight, because the translation model needs to involve many languages, for example, a translation model of iFLYtek can involve 40 languages, ranges of a used weight are different for different languages. For example, for Chinese, 1*H*W, 2*H*W, and 3*H*W in the weight CI*H*W may be used, that is, the first layer, the second layer, and the third layer of a depth layer are used. Certainly, sub-division may be performed. For example, Cantonese corresponds to 1*H*W, and the Beijing dialect corresponds to 2*H*W. No enumeration is provided herein. Because computation of other weights increases a computation amount and a computation result interferes with a translation result, other location ranges are zeroed, thereby avoiding an impact caused by element values of other layers to an effective element value, and improving translation accuracy.

Preferably, the method of translating the first voice information of the first dialect into the second voice information of the second dialect may be implemented by using a common method, for example, a translation robot of iFLYtek, and certainly, may be implemented in another manner, for example, Google Voice, or Apple Voice (siri).

Step S203: The smart phone plays the second voice information of the second dialect by using a speaker device.

In the technical solutions provided in this application, when the calling request is received, the calling request is answered, and the calling connection is established. After the first voice information is received based on the calling connection, the first language and the first dialect of the first voice information are determined, and then the translation model corresponding to the first dialect is extracted to translate the first dialect into the second voice information of the second dialect. In this way, translation between different dialects of a same language is implemented, communication costs are reduced, and user experience is improved.

A method of generating an input matrix E by using the first voice information may be implemented by using a method of generating an input matrix in an existing classification and identification algorithm. For example, a waveform graph (for example, the waveform graph may be directly collected by using recording software) of the first voice information is collected, multiple values are sampled in the waveform graph, and the multiple values are arranged in sequence to form the input matrix. Certainly, there may be another manner, and this application is not limited to the foregoing manner of generating the input matrix.

The computation performed by using the first weight and the input data that corresponds to the first dialect includes a matrix operation. The matrix operation may specifically include:

if a matrix multiplication operation is performed on an input matrix E and a weight matrix p, then splitting the input matrix E into $\alpha$ column matrices based on a quantity of columns, splitting the weight matrix p into $\alpha$ row matrices based on a quantity of rows, separately sending the $\alpha$ column matrices and $\alpha$ row matrices to $\alpha$ computation units for an inner product operation to obtain a matrix sub-results, and adding values of locations corresponding to the $\alpha$ matrix sub-results to obtain a computation result.

To increase a computation speed, the input matrix E and the weight matrix p are respectively split into $\alpha$ column matrices and $\alpha$ row matrices, and then a corresponding column matrix and row matrix are sent to one computation apparatus for computation. For example, the first column matrix and the first row matrix are sent to the first computation unit, the second column matrix and the second row matrix are sent to the second computation unit, and so on. Therefore, splitting and computation can be implemented, thereby implementing parallel computation and increasing a computation speed.

Figure 3:
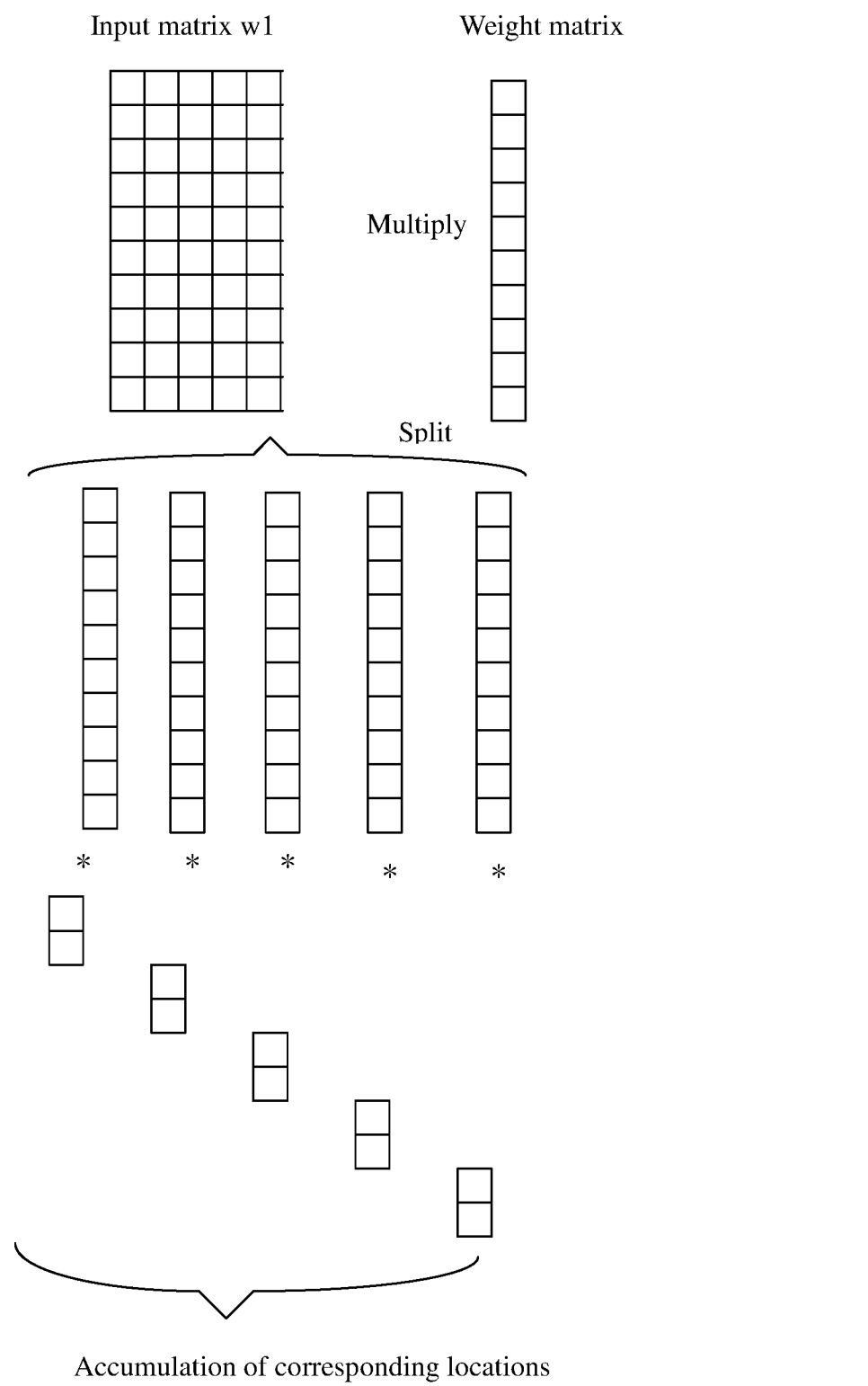
FIG. 3 is a schematic splitting diagram of an input matrix and a weight matrix.

Referring to FIG. 3, an actual example is provided below. For ease of description, the input matrix E is a 5*10 matrix and the weight matrix is a 10*1 matrix.

If $\alpha$ is 5, then an input matrix E2 is split into five 1*10 column matrices based on columns, the 10*1 matrix is split into five 2*1 matrices, and the first 1*10 column matrix and 2*1 matrix are allocated to the first computation unit. Similarly, the others are respectively allocated to other four computation units for computation, so that five result matrices can be obtained, and values of locations corresponding to the five result matrices are added to obtain a computation result of the input matrix E and the weight matrix.

In the technical solutions provided in this application, parallel computation on input data and weight data is implemented by using a splitting and parallel computation method, so that a computation speed is increased. In addition, a relatively low requirement is imposed on memories of multiple computation units, and a reason is as follows: A data amount of split data decreases, and a relative memory is relative small. The computation unit may be specifically a combination of a summator and a multiplier.

Figure 4:
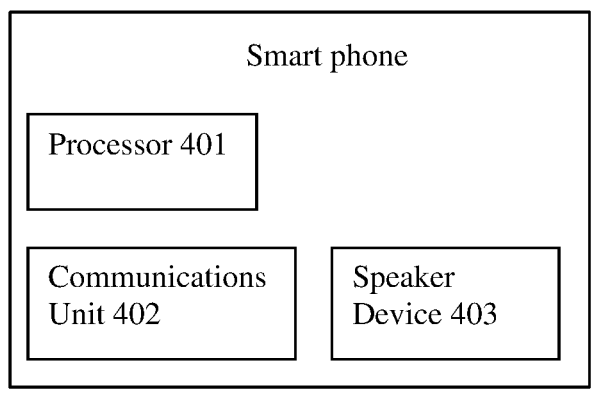
FIG. 4 is a schematic structural diagram of a smart phone according to an embodiment of the present application.

Referring to FIG. 4, FIG. 4 provides a smart phone. The smart phone includes a processor 401, a communication unit 402, and a speaker device 403 (a louder speaker or a telephone receiver).

The communication unit is configured to receive a calling request sent by a terminal, connect the calling request, establish a calling connection, and receive first voice information transmitted through the calling connection.

The processor is configured to identify the first language and the first dialect that correspond to the first voice information, obtain a translation model corresponding to the first dialect, translate the first voice information of the first dialect into second voice information of the second dialect, and control the speaker device to play the second voice information of the second dialect.

An embodiment of the present application further provides a computer storage medium. The computer storage medium stores a computer program used for electronic data exchange, and the computer program enables a computer to perform some or all steps of any method for supporting translation of global languages in the method embodiment.

An embodiment of the present application further provides a computer program product. The computer program product includes a non-transitory computer readable storage medium storing a computer program. The computer program may be operated to enable a computer to perform some or all steps of any method for supporting translation of global languages in the method embodiment.

It should be noted that, to make the description brief, the foregoing method embodiments are expressed as a series of actions. However, a person skilled in the art should appreciate that the present application is not limited to the described action sequence, because according to the present application, some steps may be performed in other sequences or performed simultaneously. In addition, a person skilled in the art should also appreciate that all the embodiments described in the specification are optional embodiments, and the related actions and modules are not necessarily mandatory to the present application.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software program unit.

When the integrated unit is implemented in the form of a software program unit and sold or used as an independent product, the integrated unit may be stored in a computer-readable memory. Based on such an understanding, the technical solutions of the present application essentially, or the part contributing to the prior art, or all or a part of the technical solutions may be implemented in the form of a software product. The software product is stored in a memory and includes several instructions for instructing a computer device (which may be a personal computer, a server, or a network device) to perform all or a part of the steps of the methods described in the embodiments of the present application. The foregoing memory includes: any medium that can store program code, such as a USB flash drive, a read-only memory (ROM, Read-Only Memory), a random access memory (RAM, Random Access Memory), a removable hard disk, a magnetic disk, or an optical disc.

A person of ordinary skill in the art may understand that all or some steps in the method in the embodiments may be completed by a program instructing related hardware. The program may be stored in a computer-readable memory. The memory may include a flash drive, a read-only memory (ROM for short), a random access memory (RAM for short), a magnetic disk, an optical disc, or the like.

The embodiments of the present application are described in detail above. A principle and an implementation of the present application are described in this specification by using a specific example. Descriptions of the foregoing embodiments are merely used to help understand the method in the present application and a core idea thereof. Meanwhile, a person of ordinary skill in the art makes modifications to specific implementations and the application scope based on the idea of the present application. To sum up, content of this specification should not be understood as a limitation to the present application.

What is claimed is:

1. A smart phone comprising a processor, a communication means and a speaker device, wherein
the communication means is configured to receive a calling request sent by a terminal, connect the calling request, establish a calling connection, and receive first voice information transmitted through the calling connection; and
the processor is configured to identify a first language and a first dialect that correspond to the first voice information, obtain a translation model corresponding to the first dialect, translate the first voice information of the first dialect into second voice information of a second dialect, and control the speaker device to play the second voice information of the second dialect;
the processor is configured to: if the translation model is a deep learning model, determine a first location range of a weight corresponding to the first dialect in the deep learning model, reserve an element value in the first location range of the weight, zero all remaining locations of the weight to obtain a first weight corresponding to the first dialect, and perform computation and translation by using the first weight and input data that corresponds to the first dialect, to obtain the second voice information of the second dialect.

2. The smart phone of claim 1, wherein the processor is configured to extract a current location of the terminal corresponding to the first voice information, identify a nationality and a city of the current location, determine a language corresponding to the nationality as the first language, and determine a dialect corresponding to the city as the first dialect.

3. The smart phone of claim 1, wherein the processor is configured to extract a number of the terminal corresponding to the first voice information, determines a native place of a user corresponding to the number, determines a language of a country corresponding to the native place as the first language, and determines a dialect corresponding to the native place as the first dialect.

* * * * *